(12) United States Patent
Li et al.

(10) Patent No.: US 9,564,094 B2
(45) Date of Patent: Feb. 7, 2017

(54) METHOD AND DISPLAY DEVICE FOR UNIFORM IMAGE DISPLAY

(71) Applicant: Shenzhen China Star Optoelectronics Technology Co., Ltd., Shenzhen, Guangdong (CN)

(72) Inventors: Man Li, Guangdong (CN); Feilin Ji, Guangdong (CN); Xiaoping Tan, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 117 days.

(21) Appl. No.: 14/433,640

(22) PCT Filed: Jan. 6, 2015

(86) PCT No.: PCT/CN2015/070187
§ 371 (c)(1),
(2) Date: Apr. 3, 2015

(87) PCT Pub. No.: WO2016/106790
PCT Pub. Date: Jul. 7, 2016

(65) Prior Publication Data
US 2016/0343326 A1 Nov. 24, 2016

(30) Foreign Application Priority Data

Dec. 29, 2014 (CN) .......................... 2014 1 0843015

(51) Int. Cl.
G09G 3/36 (2006.01)
G06F 3/041 (2006.01)
G06F 3/044 (2006.01)

(52) U.S. Cl.
CPC ............. *G09G 3/3655* (2013.01); *G06F 3/041* (2013.01); *G06F 3/044* (2013.01); *G06F 3/0412* (2013.01);
(Continued)

(58) Field of Classification Search
CPC ................ G09G 3/3655; G09G 3/3607; G09G 2300/0408; G09G 2300/0426; G09G 2320/0233; G09G 3/36; G06F 3/0412; G06F 3/0416; G06F 3/044; G06F 3/041
See application file for complete search history.

(56) References Cited

U.S. PATENT DOCUMENTS

| 6,778,157 B2* | 8/2004 | Aoki ..................... G09G 3/2011 345/100 |
| 2002/0126209 A1* | 9/2002 | Yamada ............... H04N 3/1587 348/219.1 |

(Continued)

*Primary Examiner* — Tom Sheng
(74) *Attorney, Agent, or Firm* — Andrew C. Cheng

(57) ABSTRACT

A method and a display device for uniform image display are provided. The method is used for a full in-cell display device and includes steps of: a display device inputting a first image signal, compensating the first image signal according to image compensation data to obtain a third image signal and displaying the third image signal. The display device includes a color filter substrate, an array substrate and a liquid crystal layer disposed therebetween. A side of the array substrate facing toward the liquid crystal layer is disposed touch electrodes. The touch electrodes are combined with common electrodes of the array substrate and arranged on the array substrate in a matrix. The compensation data are common electrode voltage offsets determined according to differences between grayscale information of the first image signal and an original second image signal. Accordingly, the invention can effectively improve the displayed image uniformity.

7 Claims, 4 Drawing Sheets

(52) U.S. Cl.
CPC ............... G06F 3/0416 (2013.01); G09G 3/36 (2013.01); G09G 3/3607 (2013.01); *G09G 2300/0408* (2013.01); *G09G 2300/0426* (2013.01); *G09G 2320/0233* (2013.01)

(56) References Cited

U.S. PATENT DOCUMENTS

| | | | | |
|---|---|---|---|---|
| 2003/0063047 A1* | 4/2003 | Starr | .................... | G09G 3/3655 345/32 |
| 2004/0227697 A1* | 11/2004 | Mori | ....................... | G09G 3/20 345/30 |
| 2007/0024552 A1* | 2/2007 | Shimizu | ............... | G09G 3/3614 345/87 |
| 2010/0266221 A1* | 10/2010 | Sezaki | ................. | H04N 17/004 382/298 |
| 2011/0141079 A1* | 6/2011 | Ito | ............................ | G09G 3/20 345/207 |
| 2012/0044178 A1* | 2/2012 | Song | .................... | G06F 3/0412 345/173 |
| 2012/0113339 A1* | 5/2012 | Park | ........................ | G06F 3/044 349/33 |
| 2013/0077034 A1* | 3/2013 | Jung | ...................... | G02F 1/1345 349/122 |
| 2014/0104508 A1* | 4/2014 | Yamazaki | ............ | G02F 1/13338 349/12 |
| 2014/0111466 A1* | 4/2014 | Kim | ......................... | G06F 3/044 345/174 |
| 2014/0118299 A1* | 5/2014 | Wang | ..................... | G06F 3/0416 345/174 |
| 2014/0210841 A1* | 7/2014 | Song | ........................ | G09G 3/34 345/589 |
| 2015/0103048 A1* | 4/2015 | Nakayama | .............. | G06F 3/044 345/174 |
| 2015/0179125 A1* | 6/2015 | Choi | ........................ | G09G 3/20 345/212 |
| 2015/0332638 A1* | 11/2015 | Li | ......................... | G09G 3/3648 345/214 |
| 2016/0253022 A1* | 9/2016 | Liu | ........................ | G02F 1/1333 |

\* cited by examiner

METHOD AND DISPLAY DEVICE FOR UNIFORM IMAGE DISPLAY

TECHNICAL FIELD

The invention relates to the field of display technology, and particularly to a method and a display device for uniform image display.

DESCRIPTION OF RELATED ART

A touch screen, also known as touch panel, is an inductive type liquid crystal display device which can receive an input signal triggered by a touch object such as finger. When a graphic button on a screen is touched, a haptic feedback system on the screen can determine an occurred position of the touch operation based on a preset driving scan mode and then determine the clicked graphic button as well as the type of instruction. Compared with the traditional mechanical press-button panel, the touch screen is more convenient and therefore has been widely used.

A projected capacitive touch screen is one of commonly used touch screens and also is a touch technology of using a capacitance change generated when a finger approaches a capacitive touch panel. Such touch technology is classified into self-capacitance touch technology and mutual-capacitance touch technology and also may be classified into externally-mounted touch technology and embedded touch technology. The embedded touch technology includes in-cell touch technology and on-cell touch technology. With the development of touch screen technology, the in-cell technology is becoming a mainstream technology for small and medium-sized touch screens. The in-cell technology integrate touch electrodes into cells and uses a same controller IC to process an image signal and a touch-control signal by time-division multiplexing principle, and therefore thickness and weight of the touch-control display panel both are reduced to some extent.

Existing in-cell touch technologies include a hybrid in-cell touch technology and a full in-cell touch technology. Since the full in-cell touch technology has a relatively simple structure and thus has become the development trend of touch-control display technology. However, the full in-cell technology integrates touch electrodes into common electrodes of an array substrate, the structure inevitably is more complex with respect to a mere display panel, the number of wires connected to a same electrode relatively is increased, but the space of the display screen is limited and the distribution space of signal wires also is limited, so that in the limited space, lengths of wires connected to pixel electrodes and common electrodes of the array substrate are not equal, and finally voltages applied on liquid crystal pixels are not equal, the displayed image is non-uniform as a result.

In order to overcome the above problem, driving electrodes and respective neighboring common electrodes are connected through switching transistors so as to ensure liquid crystal pixel voltages in the full in-cell display device to be equal. But the above-described method not only requires improving the array substrate manufacturing process itself but also requires adding additional transistors, so that the structure of the full in-cell display device is more complex and the transistor cost is increased.

SUMMARY

Accordingly, a technical problem mainly to be solved by the invention is to provide a method and a display device for uniform image display, which is capable of effectively improving the displayed image uniformity under the premise of without changing the full in-cell display device structure.

In order to solve the above technical problem, a technical solution adopted by the invention is to provide a method for uniform image display. The method is adapted for being applied to a full in-cell display device and includes steps of:

a display device inputting a first image signal, wherein the display device includes a color filter substrate, an array substrate and a liquid crystal layer disposed between the color filter substrate and the array substrate, a side of the array substrate facing toward the liquid crystal layer is disposed with touch electrodes, the touch electrodes are combined with common electrodes of the array substrate and arranged on the array substrate in a matrix manner;

compensating the first image signal according to image compensation data to obtain a third image signal, wherein the image compensation data are offsets of voltages of the common electrodes of the array substrate of the display device determined according to differences between grayscale information of the first image signal and grayscale information of an original second image signal corresponding to the first image signal; and displaying the third image signal.

In an embodiment, the step of compensating the first image signal according to image compensation data to obtain a third image signal concretely includes: compensating voltages of input signals of pixel electrodes corresponding to the respective common electrodes according to the offsets of the voltages of the common electrodes of the array substrate to make voltage differences between the voltages of the input signals of the pixel electrodes and the voltages of the respective common electrodes be equal and thereby obtaining the third image signal.

In order to solve the above technical problem, another technical solution adopted by the invention is to provide a method for uniform image display. The method is adapted for being applied to a full in-cell display device and includes steps of:

a display device obtaining a first image signal of an image displayed on a screen of the display device, wherein the display device includes oppositely disposed color filter substrate and array substrate and a liquid crystal layer disposed between the color filter substrate and the array substrate, a side of the array substrate facing toward the liquid crystal layer is disposed with touch electrodes, the touch electrodes are combined with common electrodes of the array substrate and arranged on the array substrate in a matrix manner;

comparing the first image signal and an original second image signal corresponding to the first image signal to determine compensation data for the first image signal; and storing the compensation data.

In an embodiment, the step of comparing the first image signal and an original second image signal corresponding to the first image signal to determine compensation data for the first image signal concretely includes: the display device calculating differences between grayscale information of the first image signal and grayscale information of the second image signal corresponding to the first image signal and outputted from a signal source, determining offsets of voltages of the common electrodes corresponding to the respective differences and determining the compensation data for the first image signal according to the offsets.

In an embodiment, the step of obtaining a first image signal of an image displayed on a screen of the display device concretely includes: the display device obtaining the first image signal of the image displayed on the screen from a detection apparatus, wherein the detection apparatus obtains the first image signal by photographing the image displayed on the screen.

In an embodiment, the detection apparatus includes a charge-coupled device (CCD) camera.

In order to solve the above technical problem, still another technical solution adopted by the invention is to provide a full in-cell display device for uniform image display. The display device includes electrically connected driving circuit, compensating circuit and display panel. The display panel includes oppositely disposed color filter substrate and array substrate and a liquid crystal layer disposed between the color filter substrate and the array substrate, a side of the array substrate facing toward the liquid crystal layer is disposed with touch electrodes, the touch electrodes are combined with common electrodes of the array substrate and arranged on the array substrate in a matrix manner. The driving circuit is configured (i.e., structured and arranged) for inputting a first image signal. The compensating circuit is configured for compensating the first image signal according to image compensation data to obtain a third image signal, the image compensation data are offsets of voltages of the common electrodes of the array substrate of the display device determined according to differences between grayscale information of the first image signal and grayscale information of an original second image signal corresponding to the first image signal. The display panel is configured for displaying the third image signal.

In an embodiment, the compensating circuit concretely is configured for compensating voltages of input signals of pixel electrodes corresponding to the respective common electrodes according to the offsets of the voltages of the common electrodes of the array substrate to make voltage differences between the voltages of the input signals of the pixel electrodes and the voltages of the respective common electrodes and thereby obtaining the third image signal.

The efficacy can be achieved by the invention is that: different from the prior art, the display device of the invention compensates a first image signal according to compensation data after inputting the first image signal to thereby obtain a third image signal. The compensation data are offsets of voltages of the common electrodes of the array substrate of the display device determined according to differences between grayscale information of the first image signal and grayscale information of an original second image signal corresponding to the first image signal, so that voltage differences between voltages of input signals of pixel electrodes of the display device and the voltages of the respective common electrodes are equal after compensation, the displayed image uniformity can be effectively improved under the premise of without changing the existing full in-cell display device structure and without increasing the cost, the user's viewing experience is improved as a result.

BRIEF DESCRIPTION OF THE DRAWINGS

In order to more clearly illustrate the technical solutions of various embodiments of the present invention, drawings will be used in the description of embodiments will be given a brief description below. Apparently, the drawings in the following description only are some embodiments of the invention, the ordinary skill in the art can obtain other drawings according to these illustrated drawings without creative effort. In the drawings.

DETAILED DESCRIPTION OF EMBODIMENTS

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

Figure 1:
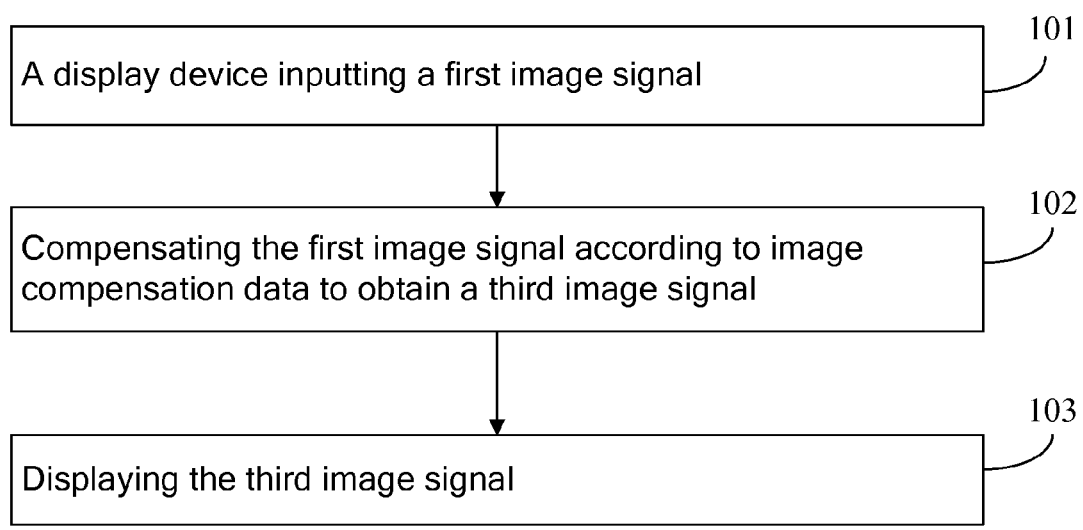
FIG. 1 is a flowchart of an embodiment of a method for uniform image display of the invention.

Referring to FIG. 1, which is a flowchart of an embodiment of a method for uniform image display of the invention. The method for uniform image display is adapted for being applied to a full in-cell display device, and in other embodiment it may be applied to other type display device and thus is not limited herein. The method in this embodiment includes following steps that:

101: the display device inputting a first image signal.

When the display device displays an image, it firstly needs to communicate with a signal source and then inputs a first image signal to be displayed from the signal source.

Figure 2:
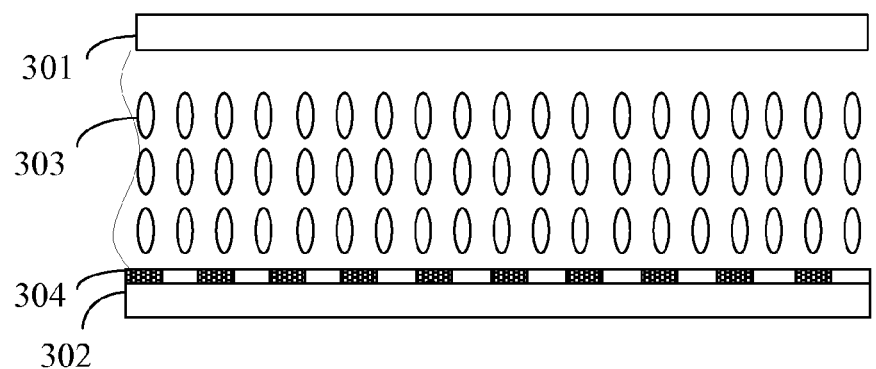
FIG. 2 is a structural schematic view of an embodiment of the display device in FIG. 1.

Specifically, as shown in FIG. 2, which is a structural schematic view of an embodiment of the display device associated with FIG. 1. The display device in this embodiment is a full in-cell display device and concretely includes oppositely disposed color filter (CF) substrate 301 and array substrate 302 and a liquid crystal (LC) layer 303 disposed between the color filter substrate 301 and the array substrate 302. Touch electrodes 304 are combined with common electrodes (Array Vcom) of the array substrate 302 and located at an inner side of the array substrate 302, i.e., a side facing toward the liquid crystal layer 30. The touch electrodes 304 are arranged on the array substrate 302 in a matrix manner.

The display device implements the control of a touch-control signal and a display signal by time-division multiplexing, i.e., divides each frame time into two time segments for sending and processing the display signal and the touch-control signal respectively. When the display device is at a display stage, all the common electrodes of the array substrate 202 are short-circuited together, liquid crystal molecules 303 are controlled to be deflected, pixel electrodes are applied with voltage differences relative to respective common electrodes, if voltage differences applied on the pixel electrodes relative to the common electrodes are equal, an uniform image would be displayed on a screen of the display device.

202: compensating the first image signal according to image compensation data to obtain a third image signal.

The image compensation data are stored in the display device. When an image signal is displayed, because the display device has inevitable structural errors, in a limited space, lengths of wires connected to the pixel electrodes and the common electrodes of the array substrate 202 would be not equal, i.e., resistances of the long-distance wires and the short-distance wires are not equal, wires with different resistances would have non-equal voltage drops, voltages applied on the respective common electrodes of the array substrate are not equal, i.e., Vcom drift occurs. In order to make the inputted first image signal be uniformly displayed on the display device, it needs to ensure that a voltage difference between a voltage of an input signal of a pixel electrode terminal and a voltage of a corresponding common electrode terminal of the array substrate is a fixed value, and therefore after the display device inputting the first image signal, the first image signal is compensated to obtain the third image signal.

The compensation data are offsets of voltages of the common electrodes of the array substrate of the display device determined according to differences between grayscale information of the first image signal and grayscale information of an original second image signal corresponding to the first image signal.

Specifically, the compensation data include compensation data of various areas of the displayed image corresponding to the first image signal, the display device compensates each non-uniform display area and obtains third image signal of being uniformly displayed after the compensation. For example, when an actual grayscale value of the first image signal at a first position is 32 and the grayscale value at the first position ought to be 37 so as to maintain the consistency with other positions in the aspect of luminance, the compensation data of relative grayscale at the first position is 5; when an actual grayscale value of the first image signal at a second position is 128 and the grayscale value at the second position ought to be 131 so as to maintain the consistency with other positions in the aspect of luminance, the compensation data of relative grayscale at the second position is 3; and therefore images at the first position and the second position both need to increase the grayscale values. When an actual grayscale value of the first image signal at a third position is 250 and the grayscale value at the third position ought to be 246 so as to maintain the consistency with other positions in the aspect of luminance, the compensation data of relative grayscale at the third position is −4, that is, the image at the third position needs to decrease the grayscale value.

As the above analysis, the grayscales of image are determined by voltage differences applied on the pixel electrodes relative to the respective common electrodes. When a voltages on a common electrode drifts, a method adopted by this embodiment is to compensate a voltage of an input signal terminal of the corresponding pixel electrode so as to ensure voltage differences of all pixel electrodes relative to the respective common electrodes are equal. Concretely, the display device compensates the voltages of the input signals of pixel electrodes corresponding to the common electrode according to the offsets of the voltages of the common electrodes, how much the voltage of a common electrode offsets, how much the voltage of the input signal of the corresponding pixel electrode is compensated, so that the voltage differences between the voltages of the input signals of the pixel electrodes and the voltages of the respective common electrodes are equal.

Figure 3:
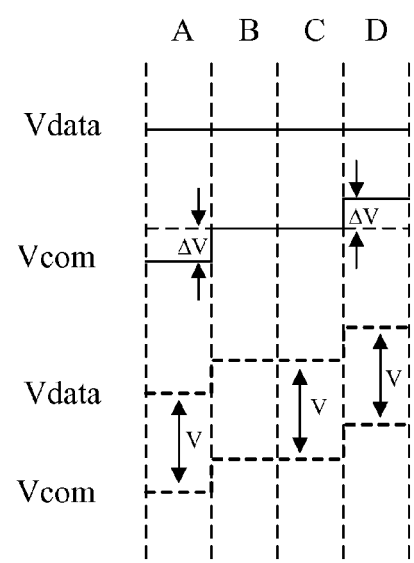
FIG. 3 is an effect diagram of voltage comparison between before and after compensation associated with a first image signal in a display stage of the invention.
Figure 4:
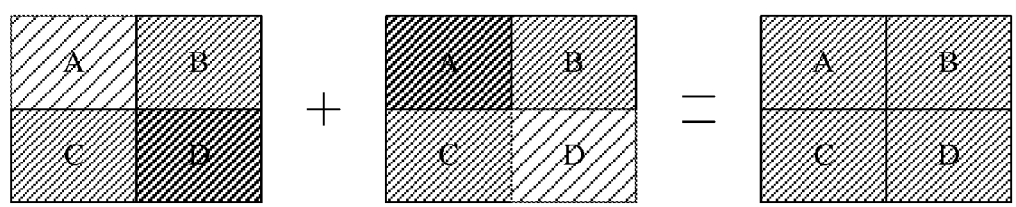
FIG. 4 is an effect diagram of luminance comparison between before and after compensation associated with a first image signal in a display stage of the invention.

As shown in FIG. 3, Vdata denoted by the solid line represents voltages of input signals of pixel electrodes before compensation and are a constant value; Vcom denoted by the solid line represents voltages of common electrodes before compensation. As seen from FIG. 3, voltages of the common electrodes at a region A and a region D respectively have a negative offset ΔV and a positive offset positive ΔV both of which have equal absolute values, i.e., the voltage of the input signal of the pixel electrode in the region A requires a compensation of −ΔV, and the voltage of the input signal of the pixel electrode in the region D requires a compensation of ΔV. Please refer to Vdata denoted by the dashed line in FIG. 3, which represents voltages of input signals of the pixel electrodes after compensation, Vcom denoted by the dashed line represents voltages of the common electrodes after compensation. After compensation, voltage differences V between the voltages of the input signals of the pixel electrodes and the voltages of the respective common electrodes in the regions A, B, C, D are equal, so that image grayscale values of the displayed image corresponding to the third image signal are corresponded after compensation, and the luminance of image is uniform. As shown in FIG. 4, which is an effect diagram of luminance comparison between before and after compensation associated with the first image signal in a display stage of the invention.

103: displaying the third image signal.

After the inputted first image signal is compensated, the third image signal corresponding to the compensated first image signal is displayed.

Different from the prior art, the full in-cell display device in this embodiment compensates the first image signal according to compensation data after inputting the first image signal to obtain the third image signal. The compensation data are offsets of voltages of common electrodes on the array substrate of the display device determined according to differences between grayscale information of the first image signal and grayscale information of an original second image signal corresponding to the first image signal, so that voltage differences between voltages of input signals of pixel electrodes and voltages of the respective common electrodes are equal after compensation, the uniformity of displayed image can be effectively improved under the premise of without changing the conventional full in-cell display device structure and the user's viewing experience is improved consequently.

Figure 5:
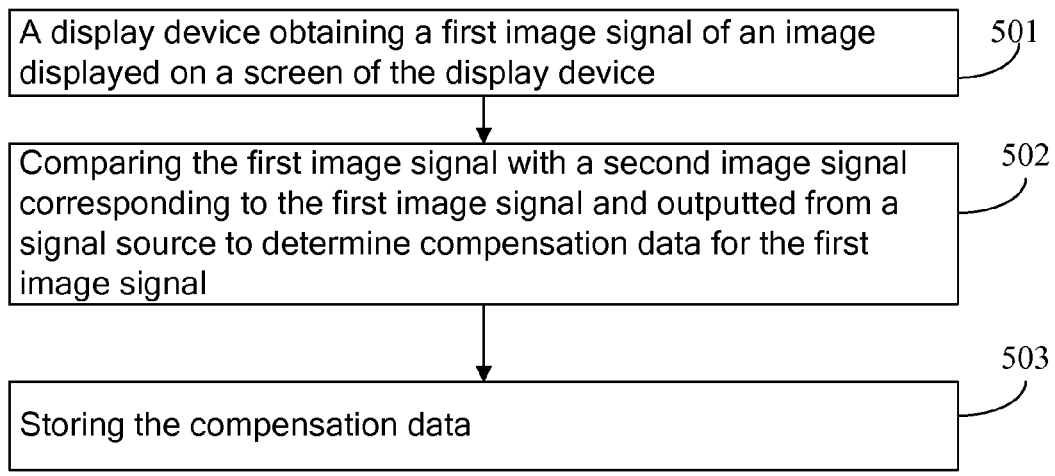
FIG. 5 is a flowchart of another embodiment of the method for uniform image display of the invention.

Referring to FIG. 5, which is a structural schematic view of another embodiment of the method for uniform image display. The method for uniform image display in this embodiment is applied to a full in-cell display device, and in other embodiment it can be applied to other display device and thus is not limited herein.

As shown in FIG. 5, the method for uniform image display in this embodiment includes following steps that:

501: a display device obtaining a first image signal of an image displayed on a screen of the display device.

The display device is a full in-cell display device and includes oppositely disposed color filter substrate and array substrate and a liquid crystal layer disposed between the color filter substrate and the array substrate. A side of the array substrate facing toward the liquid crystal layer is disposed with touch electrodes, the touch electrodes are combined with common electrodes of the array substrate and arranged on the array substrate in a matrix manner.

When the user enjoys an image displayed on a screen of a display device with touch-control display function, if the displayed image has uniform luminances, the user can view a good quality of image, but if the luminances of the displayed image are non-uniform, it will affect the user's normal viewing. In order to determine the image displayed by the display device whether is uniform or not, it needs to obtain the image displayed by the display device as a judgment and reference object. In this embodiment, the first image signal is obtained by photographing an image displayed on the screen of the display device by a detection apparatus.

Correspondingly, the display device obtains the first image signal from the detection apparatus.

A displayed luminances of screen which whether are uniform is determined by displayed grayscales of image which whether are consistent, and the displayed grayscales are determined by voltage differences between the voltages of the input signals of the pixel electrodes and the voltages of the respective common electrodes. When the voltage differences between voltages of the input signals of the pixel electrodes and the voltages of the respective common electrodes are equal, deflection angles of liquid crystal molecules are controlled to be the same, light transmittances also are the same, and finally the displayed luminances on the screen are the same, i.e., the displayed image luminances are uniform.

Moreover, a factor of affecting the uniformity of displayed image luminances is displayed grayscales of image, and therefore after the display device obtains the first image signal from the detection apparatus, the display device further obtains grayscale information of the first image signal. In particular, information of various parts of a same image are needed to be obtained.

The detection apparatus includes a high frequency camera such as CCD camera. It should be understood that, it is not limited to the camera, any apparatus which can obtain the first image signal may be used as the detection apparatus of this embodiment and thus is not limited herein.

502: comparing the first image signal with an original second image signal corresponding to the first image signal to determine compensation data for the first image signal.

The display device uses the first image signal as a reference object after receiving the first image signal and compares the first image signal with the original second image signal outputted from a data source to determine the compensation data for the first image signal, i.e., compensation data for input signal voltages of corresponding pixel electrodes.

Specifically, the display device uses a driving controller to calculate differences between grayscale information of the first image signal and grayscale information of the corresponding second image signal. The calculation includes comparing grayscale information of various areas of the first image signal with corresponding areas of the second image signal to determine the grayscale information of each area of the first image signal whether is consistent with the grayscale information of the corresponding region of the second image signal.

As the above analysis, deviations of grayscale information are caused by different deflection angles of liquid crystal molecules resulting from the voltage differences between input voltages of the pixel electrodes and voltages of the respective common electrodes being not equal, an immediate cause of the voltage differences between the input voltages of the pixel electrodes and the voltages of the respective common electrodes being not equal is voltage drifts occurred on the common electrodes, the larger the voltage drift on a common electrode is, the larger a changed amount of the voltage difference between the input voltage of the corresponding pixel electrode and the voltage of the common electrode is, the problem of non-uniform display is more serious.

Therefore, if the grayscale information of the first image signal and the grayscale information of the second image signal are not identical, offsets of voltages of the common electrodes corresponding to the first image signal further are obtained, and then the compensation data for the first image signal are obtained according to the offsets.

503: storing the compensation data.

Since once the display device is manufactured, electrodes and other components thereof generally would not be changed any more, in order to overcome the non-uniform image display caused by inevitable offsets of voltages of the common electrodes on the array substrate resulting from the structure of the display device when the display device is in use, the display device stores the compensation data for compensating the first image signal to be displayed, so that during any type of first image signal is displayed, it can be ensured that the voltage differences between the voltages of the input signals of the pixel electrodes and the voltages of the respective common electrodes are equal, and the displayed image uniformity on the screen of the display device can be ensured as a result.

Different from the prior art, the full in-cell display in this embodiment obtains the first image signal of the image displayed on the screen thereof, compares the first image signal with the original second image signal corresponding to the first image signal and outputted from the signal source to thereby determine the compensation data for the first image signal, and then stores the compensation data. Therefore, when the display device display an image signal, it can compensate the image signal according to the compensation data to make voltage differences between the input signal voltages of the pixel electrodes and the respective common electrode voltages be equal, the displayed image uniformity can be effectively improved in the circumstance of without reducing the image display luminances and the user's viewing experience also can be improved.

Figure 6:
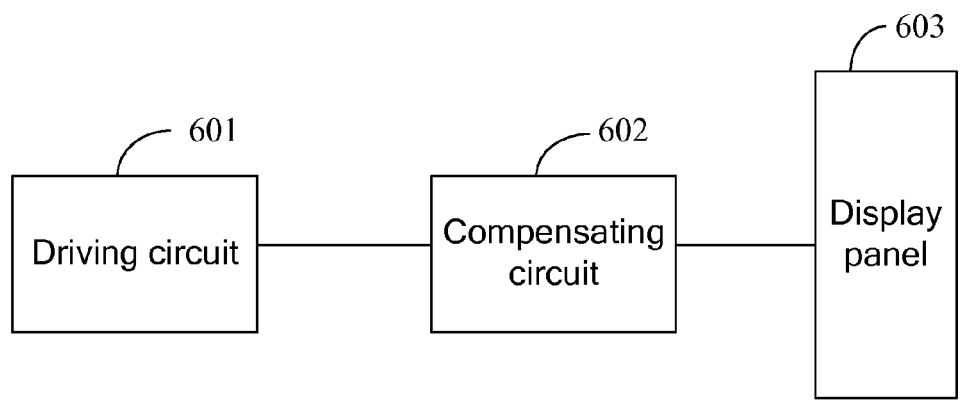
FIG. 6 is a structural schematic view of an embodiment of a full in-cell display device of the invention.

Referring to FIG. 6, which is a structural schematic view of an embodiment of a full in-cell display device of the invention.

The display device in this embodiment includes electrically connected driving circuit 601, compensating circuit 602 and display panel 603.

The display panel 603 includes oppositely disposed color filter substrate and array substrate and a liquid crystal layer disposed between the color filter substrate and the array substrate. A side of the array substrate facing toward the liquid crystal layer is disposed with touch electrodes. The touch electrodes are combined with common electrodes of the array substrate and arranged on the array substrate in a matrix manner.

The driving circuit 601 is configured (i.e., structured and arranged) for inputting a first image signal.

When the display device displays an image, it needs to firstly communicate with a signal source, and then the driving circuit 601 inputs the first image signal to be displayed.

The display device in this embodiment implements the control of a touch-control signal and a display signal by time division multiplexing, i.e., each frame time is divided into two time segments for sending and processing the display signal and the touch-control signal respectively. When the display device is at the display stage, all the common electrodes of the array substrate are short-circuited together, liquid crystal molecules are controlled to be deflected, and voltages are applied to pixel electrodes for forming voltage differences relative to respective common electrodes; if the voltage differences of the respective pixel electrodes are equal, the image will be uniformly displayed on the screen of the display device.

The compensating circuit 602 is configured for compensating the first image signal according to image compensation data to obtain a third image signal.

When an image signal is displayed, since the display device has inevitable structural errors, in a limited space, lengths of wires connected to the pixel electrodes and the common electrodes of the array substrate 302 are not equal, i.e., resistances of long-distance wires and short-distance wires are not equal, wires with different resistances would exhibit different voltage drops, so that voltages applied on common electrode terminals of the array substrate are not equal, i.e., Vcom drift occurs. In order to make the inputted first image signal be uniformly displayed on the display device, it needs to ensure that a voltage difference between an input signal voltage on a pixel electrode and a voltage on a corresponding common electrode of the array substrate 302 is a fixed value, and therefore after the display device inputting the first image signal, the first image signal is compensated to obtain the third image signal.

Figure 7:
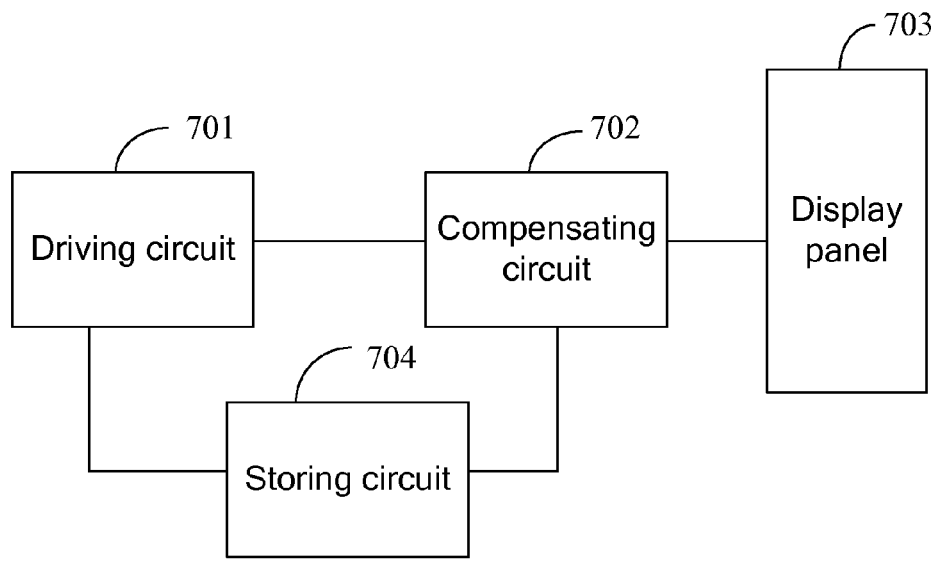
FIG. 7 is a structural schematic view of another embodiment of the full in-cell display device of the invention.

As shown in FIG. 7, the display device in this embodiment further includes a storing circuit 704 besides the driving circuit 701, the compensating circuit 702 and the display panel 703. The storing circuit 704 is configured for storing compensation data of the display device.

In particular, the compensation data are offsets of voltages of the common electrodes of the array substrate of the display device determined according to differences between grayscale information of the first image signal and grayscale information of an original second image signal corresponding to the first image signal.

Specifically, the compensation data includes compensation data of various areas of the displayed image corresponding to the first image signal. The compensating circuit 602 performs compensation to each area of non-uniform display and thereby obtains the third image signal of being uniformly displayed after the compensation. For example, when an actual grayscale value of the first image signal at a first position is 32 and the grayscale value at this position ought to be 37 so as to maintain consistency with the other positions in the aspect of luminance, the compensation data of relative grayscale at the first position is 5; when an actual grayscale value of the first image signal at a second position is 128 and the grayscale value at this position ought to be 131 so as to maintain consistency with the other positions in the aspect of luminance, the compensation data of relative grayscale of the second position is 3; and therefore the images at the first position and the second position need to increase the grayscale values. In addition, when an actual grayscale value of the first image signal at a third position is 250 and the grayscale value at this position ought to be 246 so as to maintain consistency with the positions in the aspect of luminance, the compensation data of relative grayscale at the third position is −4, i.e., the image at the third position needs to decrease the grayscale value.

As the above analysis, the grayscale values of image are determined by the voltage differences applied between the pixel electrodes and the respective common electrodes. When drifts occurred on the voltages of the common electrodes, a method adopted by this embodiment is to compensate voltages of input signal terminals of the pixel electrodes to ensure voltage differences associated with all the pixel electrodes relative to the respective common electrodes are equal. Specifically, the compensating circuit 602 compensates the voltages of the input signals of the pixel electrodes corresponding to the respective common electrodes according to the offsets of the voltages of the common electrodes, how much the voltage of a common electrode drifts, how much the voltage of the input signal of the corresponding pixel electrode is compensated, so as to make the voltage differences between the voltages of the input signals of the pixel electrodes and the voltages of the respective common electrodes be equal.

The display panel 603 is configured for displaying the third image signal.

After the inputted first image signal is compensated, the display panel 603 displays the third image signal corresponding to the first image signal after the compensation.

Different from the prior art, after the driving circuit of the full in-cell display device of this embodiment inputs the first image signal, the compensating circuit compensates the first image signal according to compensation data to obtain a third image signal. The compensation data are offsets of voltages of the common electrodes of the array substrate of the display device determined according to differences between grayscale information of the first image signal and grayscale information of an original second image signal corresponding to the first image signal, so that the voltage differences between the voltages of the input signals of the pixel electrodes and the voltages of the respective common electrodes are equal after compensation, the displayed image uniformity can be effectively improved under the condition of without changing the existing full in-cell display device structure, and the user's viewing experience also can be improved.

Figure 8:
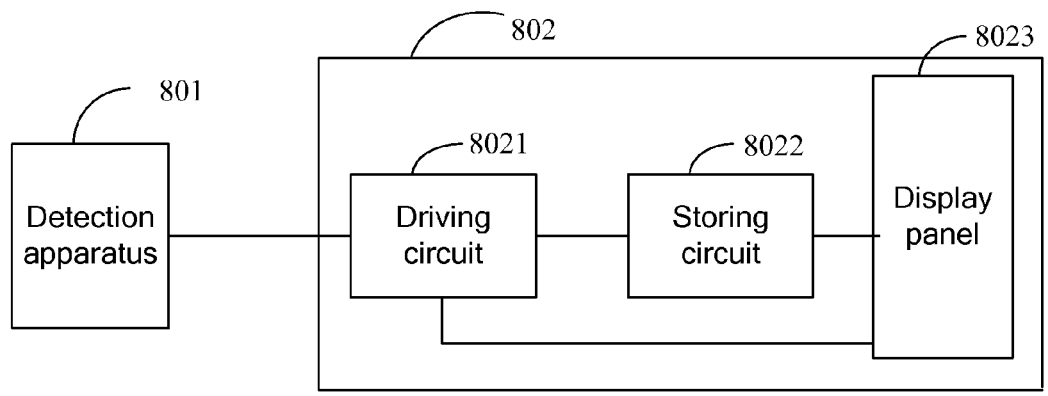
FIG. 8 is a structural schematic view of an embodiment of a system for uniform image display of the invention.

As shown in FIG. 8, FIG. 8 is a structural schematic view of an embodiment of a system for uniform image display of the invention.

The system in this embodiment includes a detection apparatus 801 and a display device 802. The display device 802 is a full in-cell display device, and in other embodiment it may be other display device and is not limited herein.

The display device 802 includes a driving circuit 8021 and a storing circuit 8022 electrically connected with each other and further includes a display panel 8023 for image display. The display panel 8023 includes a color filter substrate, an array substrate and a liquid crystal layer disposed between the color filter substrate and the array substrate. A side of the array substrate facing toward the liquid crystal layer is disposed with touch electrodes. The touch electrodes are combined with common electrodes of the array substrate and arranged on the array substrate in a matrix manner.

The detection apparatus 801 includes a high frequency camera such as CCD (charge-coupled device) camera; and it should be understood that it is not limited to the camera, any apparatus which can obtain the first image signal by photographing may be used as the detection apparatus of this embodiment and thus is not limited herein.

The detection apparatus 801 is configured for photographing an image displayed on a screen of the display device 802 to obtain the first image signal.

When the user enjoys an image displayed on a screen of a display device with touch-control display function, if the displayed image has uniform luminances, the user can view a good quality of image; but if the displayed image luminances are non-uniform, which will affect the normal viewing of the user. In order to determine the displayed image of the display device whether is uniform, the displayed image of the display device is required to be obtained as a judgment and reference object. In this embodiment, the first image signal is obtained by photographing an image displayed on the screen of the display device by the detection apparatus 801.

The driving circuit 8021 is configured for obtaining the first image signal of the displayed image on the screen of the display device from the detection apparatus 801.

Correspondingly, the driving circuit 8021 obtains the first image signal by the detection apparatus.

The screen display luminances which whether are uniform is determined by displayed grayscales of image which whether are consistent, and the displayed grayscales are determined by voltage differences between input voltages of the pixel electrodes and voltages of the respective common electrodes. When the voltage differences between the input voltages of the pixel electrodes and the voltages of the respective common electrodes are equal, deflection angles of liquid crystal molecules would be controlled to be the same, light transmittances also are the same, and finally the displayed luminances on the screen are uniform.

Furthermore, a factor of affecting the uniformity of displayed image luminances is displayed grayscales of image, and therefore after the display device obtains the first image signal from the detection apparatus, the driving circuit 8021 further obtains grayscale information of the first image signal. The grayscale information of various parts of the same image all are needed to be obtained.

The driving circuit 8021 further is configured for comparing the first image signal and an original second image signal corresponding to the first image signal to determine compensation data for the first image signal.

The driving circuit 8021 uses the first image signal as a reference object after receiving the first image signal, and then compares the first image signal with the original second image signal outputted from a data source to determine the compensation data for the first image signal, i.e., the compensation data for input signal voltages of corresponding pixel electrodes.

Specifically, the driving circuit 8021 calculates differences between grayscale information of the first image signal and grayscale information of the corresponding second image signal. The calculation includes comparing the grayscale information of various areas of the first image signal with grayscale information of corresponding areas of the second image signal to determine the grayscale information of each area of the first image signal whether is identical to the grayscale information of the corresponding area of the second image signal.

As the above analysis, deviations of grayscale information are caused different deflection angles of liquid crystal molecules resulting from the voltage differences between the input voltages of the pixel electrodes and the voltages of the respective common electrodes being not equal, an immediate cause of the voltage difference between the input voltages of the pixel electrodes and the voltages of the respective common electrodes being not equal is the drifts of the common electrode voltages, the larger the voltage drift of a common electrode is, the larger a changed amount of the voltage difference between the input voltage of the corresponding pixel electrode and the voltage of the common electrode is, the problem of non-uniform display is more serious.

Therefore, if the grayscale information of the first image signal is not identical to the grayscale information of the second image signal, the offsets of the common electrode voltages corresponding to the first image signal further are obtained, and then the compensation data are determined according to the offsets. How much the voltage of a common electrode drifts, how much the voltage of the input signal of the corresponding pixel electrode is compensated, so that the voltage differences between the voltages of the input signals of the pixel electrodes and the voltages of the respective common electrodes are equal after compensation.

The storing circuit 8022 is configured for storing the compensation data.

Since once the display device is manufactured, electrodes and other components thereof generally would not be changed any more; in order to overcome the non-uniform display of image caused by inevitable offsets of voltages of the common electrodes of the array substrate resulting from the structure of the display device when the display device is in use, the storing circuit 8022 stores the compensation data for compensating the first image signal to be displayed, so that during any type of first image signal is displayed, it can be ensured that the voltage differences between the voltages of the input signals of the pixel electrodes and the voltages of the respective common electrodes are equal, and the displayed image uniformity on the screen of the display device can be ensured consequently.

Different from the prior art, the detection apparatus this embodiment obtains the first image signal by photographing the image displayed on the screen of the display device, the driving circuit of the display device obtains the first image signal of the displayed image on the screen from the detection apparatus and compares the first image signal with the second image signal corresponding to the first image signal and outputted from a signal source to determine the compensation data for the first image signal, the storing circuit stores the compensation data. Therefore, when the display device displays an image signal, it can compensate the image signal according to the compensation data to make voltage differences between input signal voltages of the pixel electrodes and respective common electrode voltages be equal, and thus the displayed image uniformity can be effectively improved in the situation of without reducing the image displayed luminances, the user's viewing experience may be improved as a result.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for uniform image display, the method adapted for being applied to a full in-cell display device; the method comprising:

a display device inputting a first image signal, wherein the display device comprises a color filter substrate, an array substrate and a liquid crystal layer disposed between the color filter substrate and the array substrate, a side of the array substrate facing toward the liquid crystal layer is disposed with touch electrodes, the touch electrodes are combined with common electrodes of the array substrate and arranged on the array substrate in a matrix manner;

compensating the first image signal according to image compensation data to obtain a third image signal, wherein the image compensation data are offsets of voltages of the common electrodes of the array substrate of the display device determined according to differences between grayscale information of the first image signal and grayscale information of an original second image signal corresponding to the first image signal;

displaying the third image signal.

2. The method as claimed in claim 1, wherein the step of compensating the first image signal according to image compensation data to obtain a third image signal concretely comprises:

compensating voltages of input signals of pixel electrodes corresponding to the respective common electrodes according to the offsets of the voltages of the common electrodes of the array substrate to make voltage differences between the voltages of the input signals of the pixel electrodes and the voltages of the respective common electrodes be equal and thereby obtaining the third image signal.

3. A method for uniform image display, the method adapted for being applied to a full in-cell display device; the method comprising:

a display device obtaining a first image signal of an image displayed on a screen of the display device, wherein the display device comprises oppositely disposed color filter substrate and array substrate and a liquid crystal layer disposed between the color filter substrate and the array substrate, a side of the array substrate facing toward the liquid crystal layer is disposed with touch electrodes, the touch electrodes are combined with common electrodes of the array substrate and arranged on the array substrate in a matrix manner;

comparing the first image signal and an original second image signal corresponding to the first image signal to determine compensation data for the first image signal;

storing the compensation data;

wherein the step of comparing the first image signal and an original second image signal corresponding to the first image signal to determine compensation data for the first image signal concretely comprises:

the display device calculating differences between grayscale information of the first image signal and grayscale information of the second image signal corresponding to the first image signal and outputted from a signal source, determining offsets of voltages of the common electrodes corresponding to the respective differences and determining the compensation data for the first image signal according to the offsets.

4. The method as claimed in claim 3, wherein the step of obtaining a first image signal of an image displayed on a screen of the display device concretely comprises:

the display device obtaining the first image signal of the image displayed on the screen from a detection apparatus, wherein the detection apparatus obtains the first image signal by photographing the image displayed on the screen.

5. The method as claimed in claim 4, wherein the detection apparatus comprises a charge-coupled device (CCD) camera.

6. A full in-cell display device for uniform image display, comprising electrically connected driving circuit, compensating circuit and display panel; wherein the display panel comprises oppositely disposed color filter substrate and array substrate and a liquid crystal layer disposed between the color filter substrate and the array substrate, a side of the array substrate facing toward the liquid crystal layer is disposed with touch electrodes, the touch electrodes are combined with common electrodes of the array substrate and arranged on the array substrate in a matrix manner;

the driving circuit is configured for inputting a first image signal;

the compensating circuit is configured for compensating the first image signal according to image compensation data to obtain a third image signal, the image compensation data are offsets of voltages of the common electrodes of the array substrate of the display device determined according to differences between grayscale information of the first image signal and grayscale information of an original second image signal corresponding to the first image signal;

the display panel is configured for displaying the third image signal.

7. The full in-cell display device as claimed in claim 6, wherein the compensating circuit concretely is configured for compensating voltages of input signals of pixel electrodes corresponding to the respective common electrodes according to the offsets of the voltages of the common electrodes of the array substrate to make voltage differences between the voltages of the input signals of the pixel electrodes and the voltages of the respective common electrodes and thereby obtaining the third image signal.

* * * * *